Figure 1:
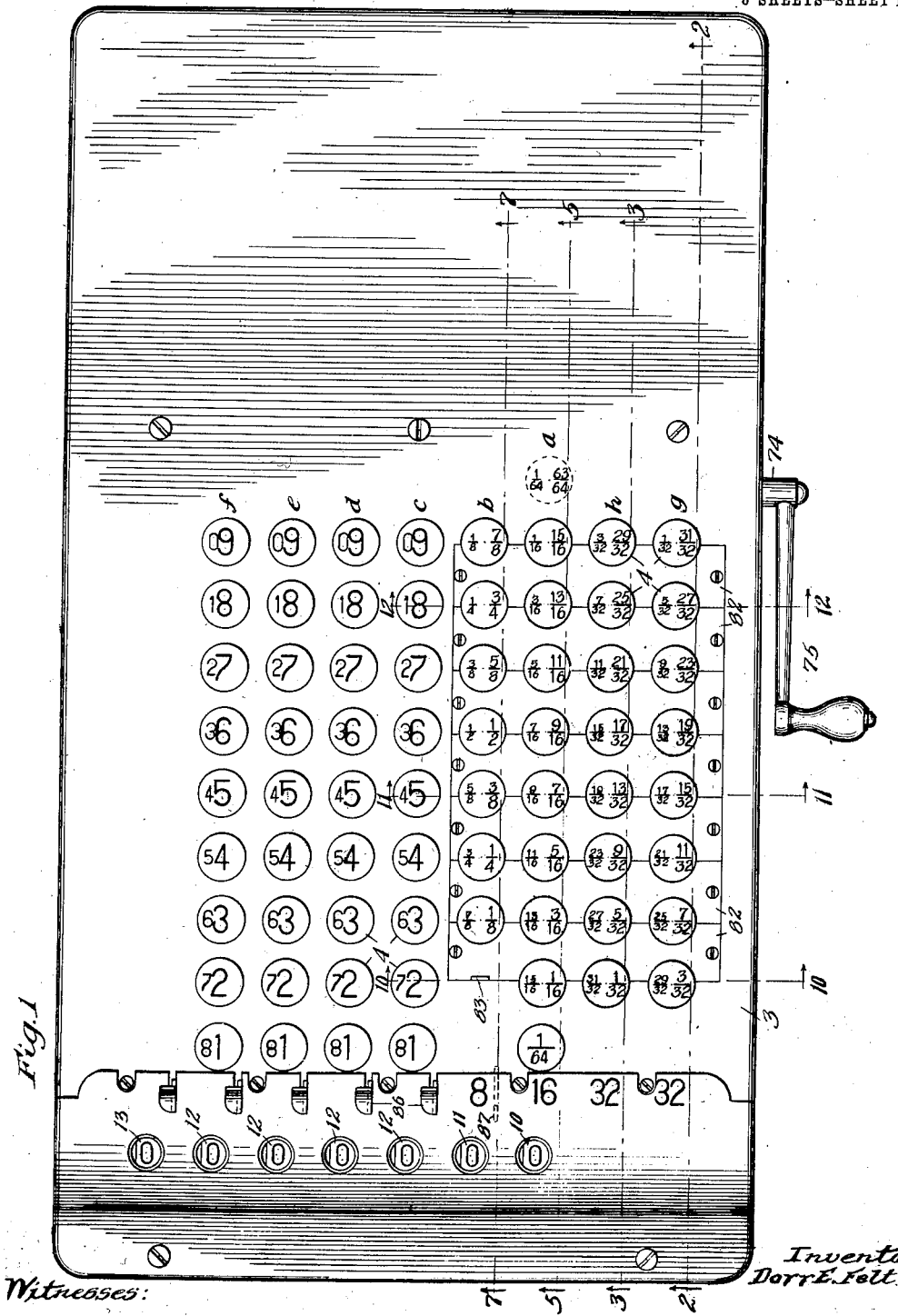

D. E. FELT.
CALCULATING MACHINE.
APPLICATION FILED APR. 5, 1913.

1,074,704.

Patented Oct. 7, 1913.

8 SHEETS—SHEET 1.

Witnesses:
Wm. Geiger
Pearl Abrams

Inventor:
Dorr E. Felt
By Munday, Evarts, Adcock & Clarke,
his Attys.

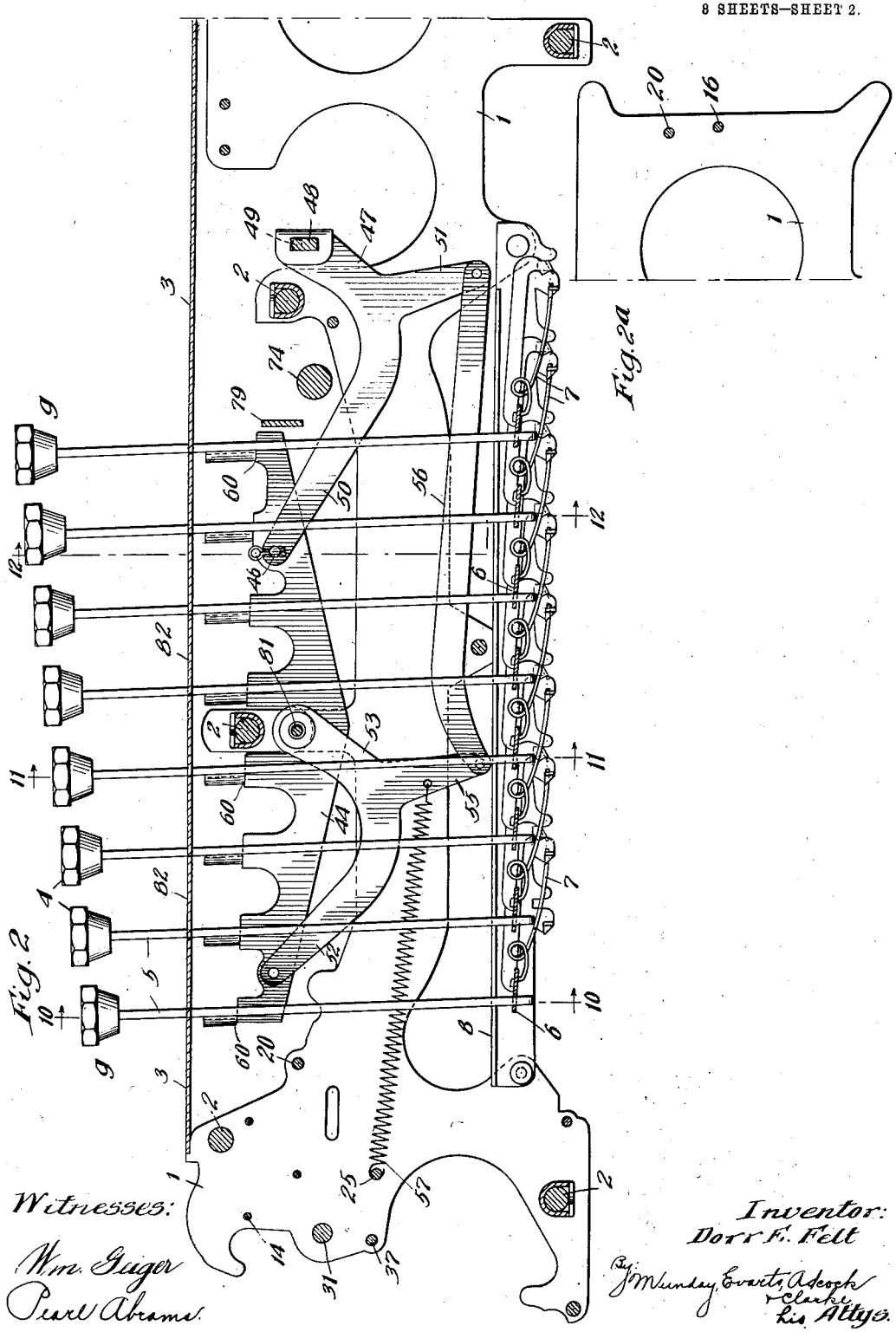

D. E. FELT.
CALCULATING MACHINE.
APPLICATION FILED APR. 5, 1913.
1,074,704.
Patented Oct. 7, 1913.
8 SHEETS—SHEET 3.
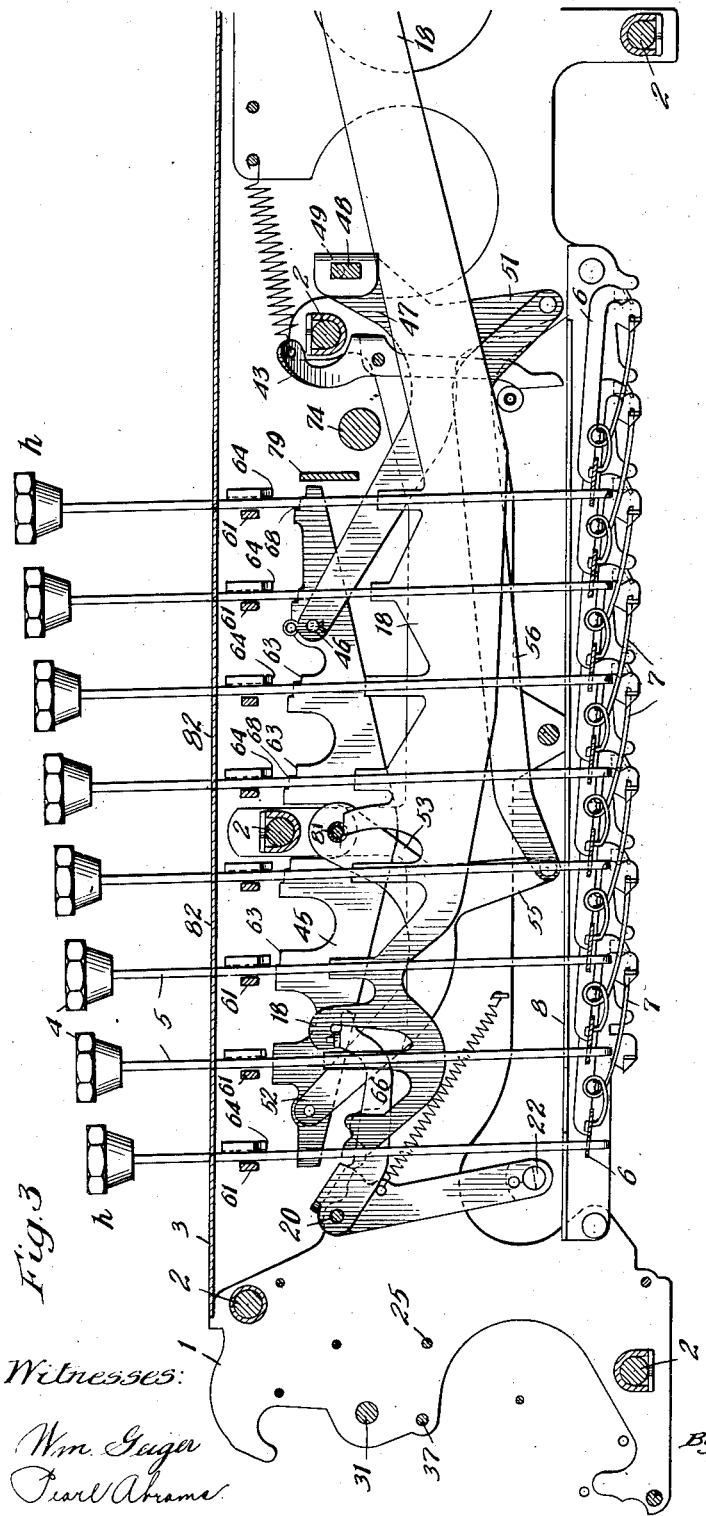
Witnesses:
Wm. Gager
Pearl Abrams
Inventor:
Dorr E. Felt
By Munday, Evarts, Adcock & Clarke,
his Attys.

D. E. FELT.
CALCULATING MACHINE.
APPLICATION FILED APR. 5, 1913.
1,074,704.
Patented Oct. 7, 1913.
8 SHEETS—SHEET 4.
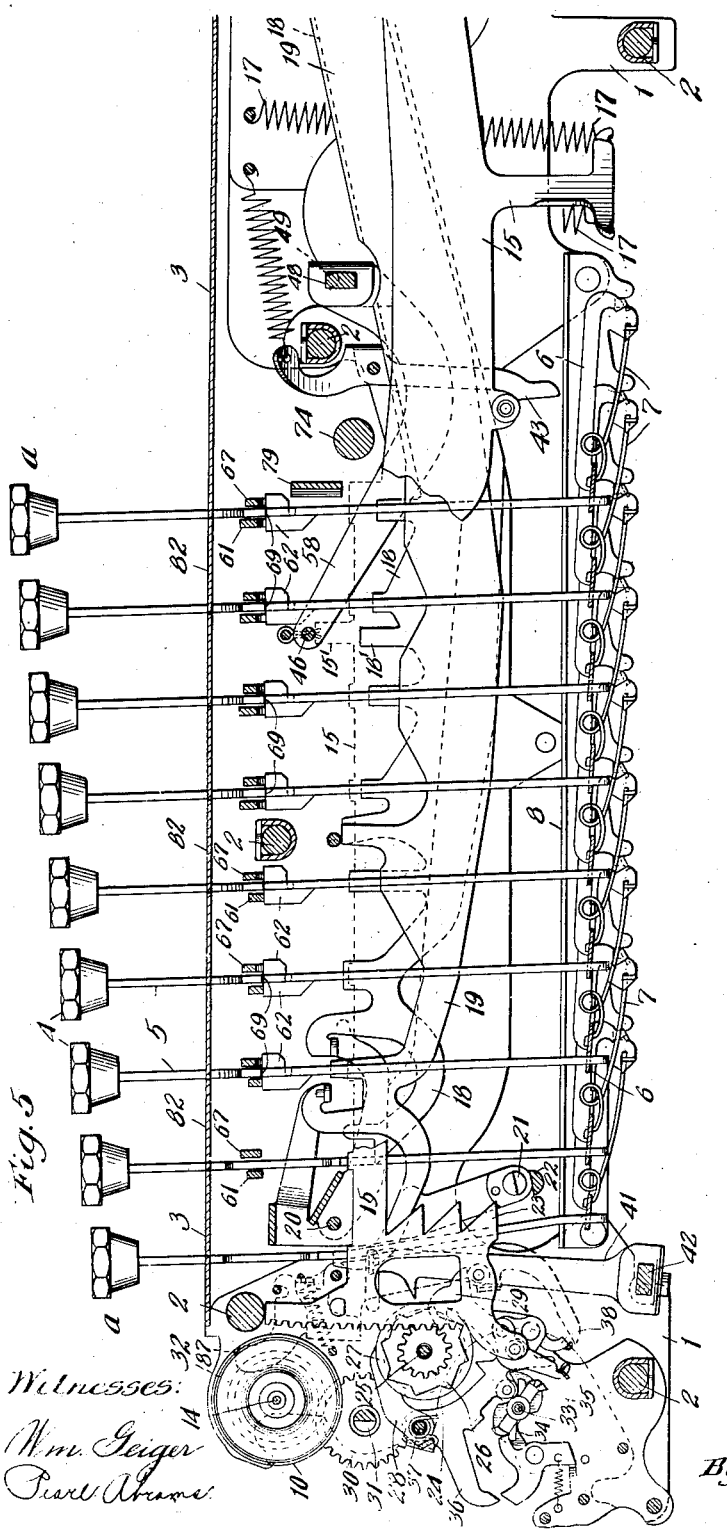

D. E. FELT.
CALCULATING MACHINE.
APPLICATION FILED APR. 5, 1913.
1,074,704.
Patented Oct. 7, 1913.
8 SHEETS—SHEET 5.
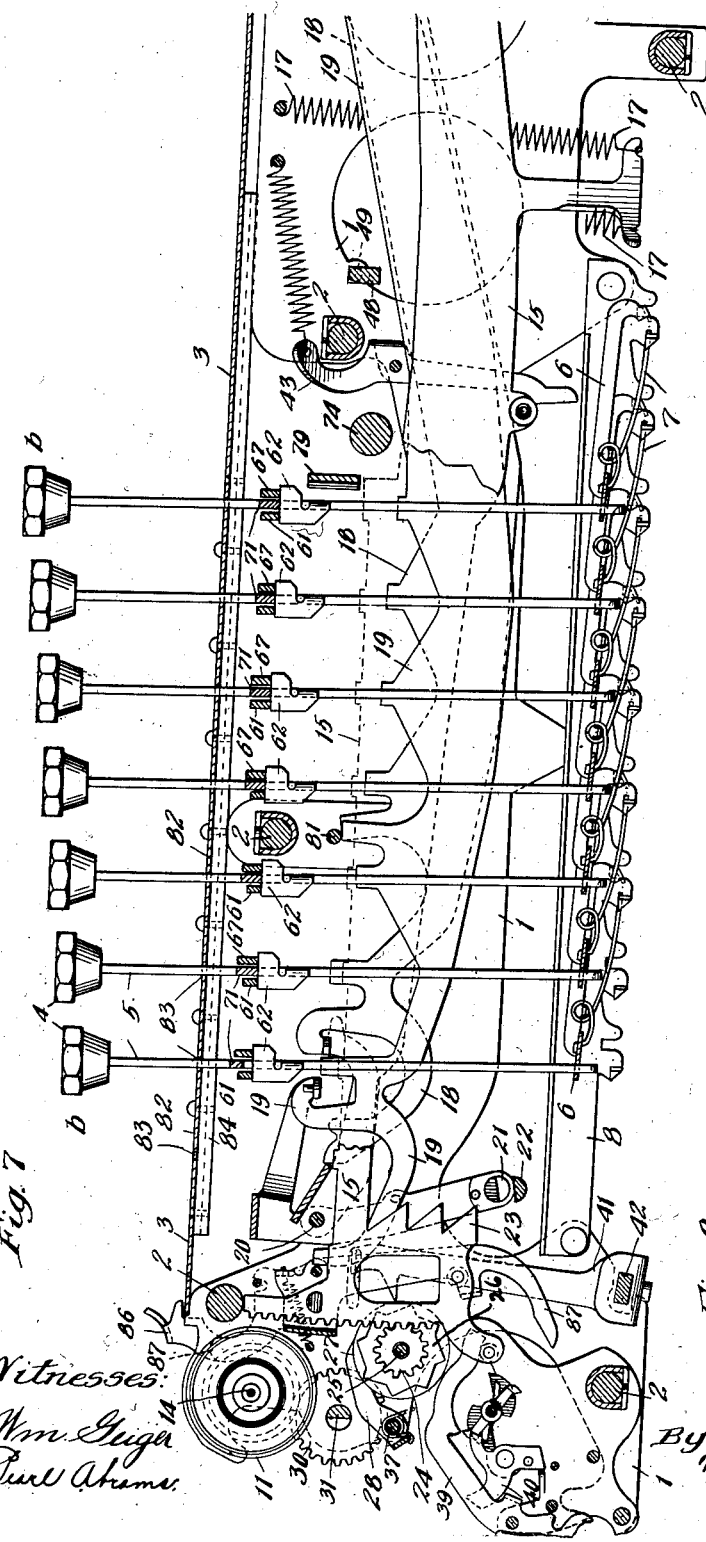

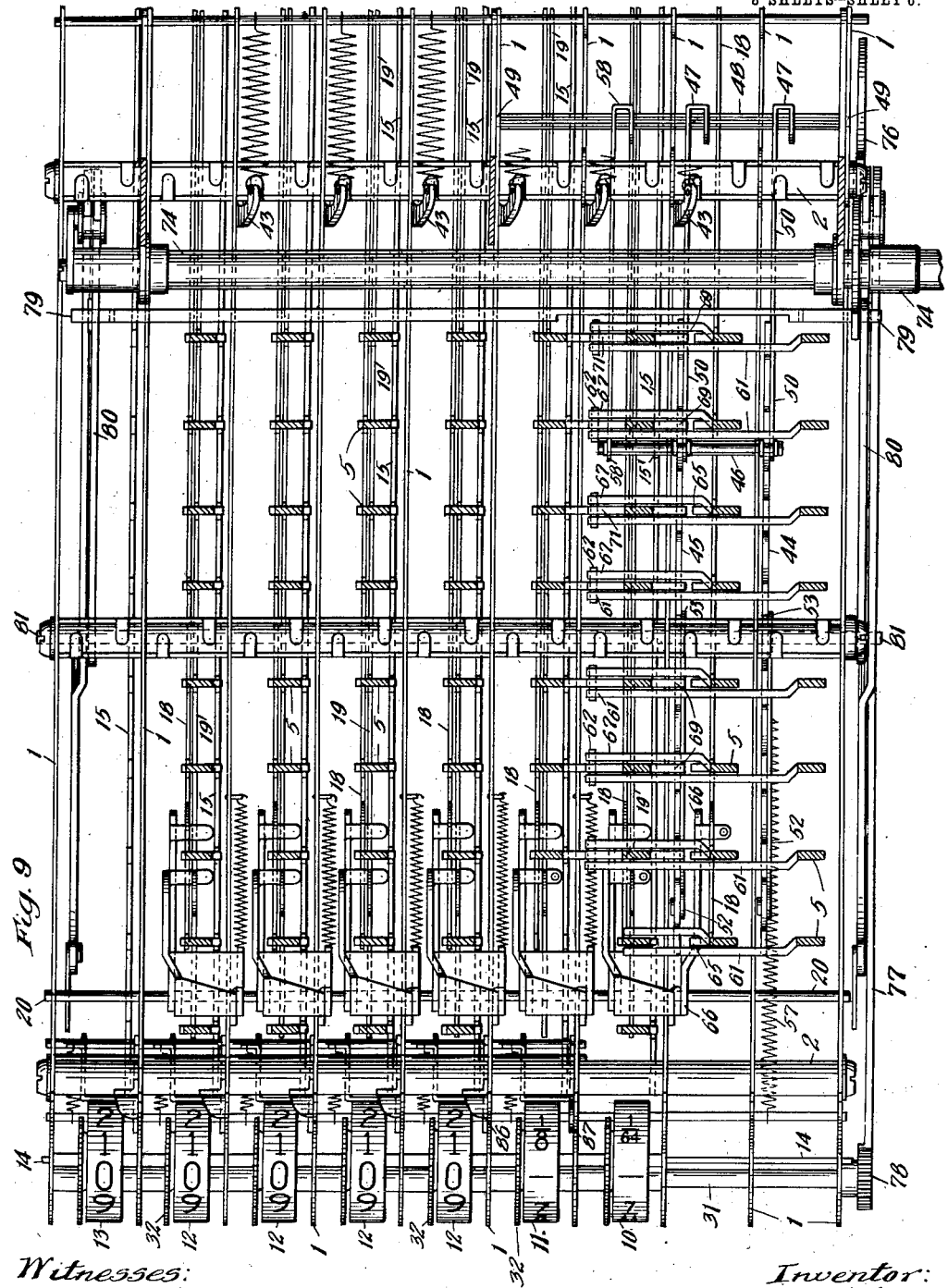

D. E. FELT.
CALCULATING MACHINE.
APPLICATION FILED APR. 5, 1913.
1,074,704.
Patented Oct. 7, 1913.
8 SHEETS—SHEET 7.
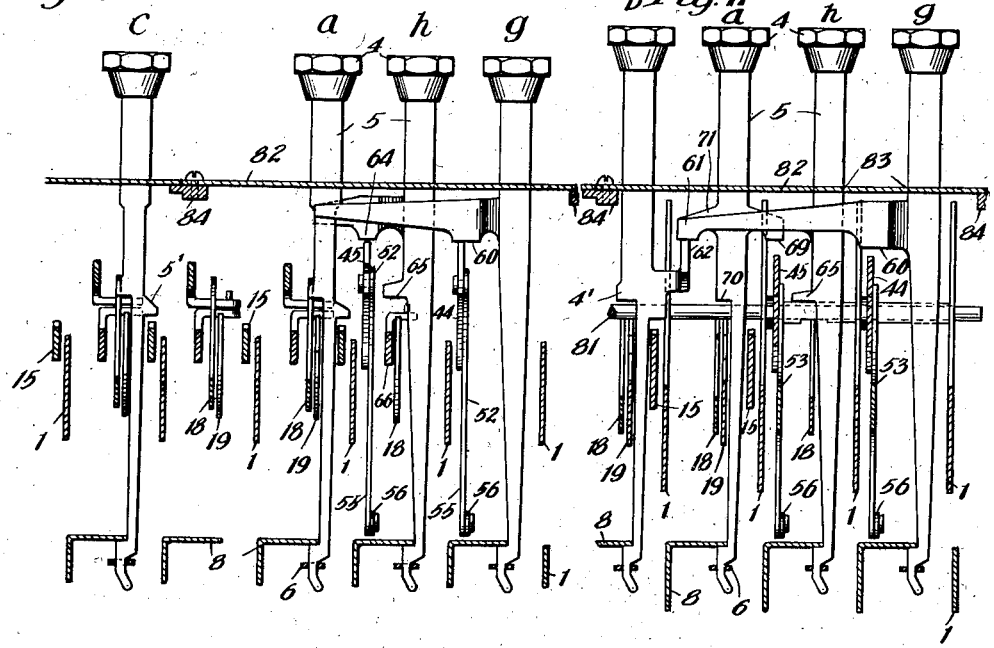
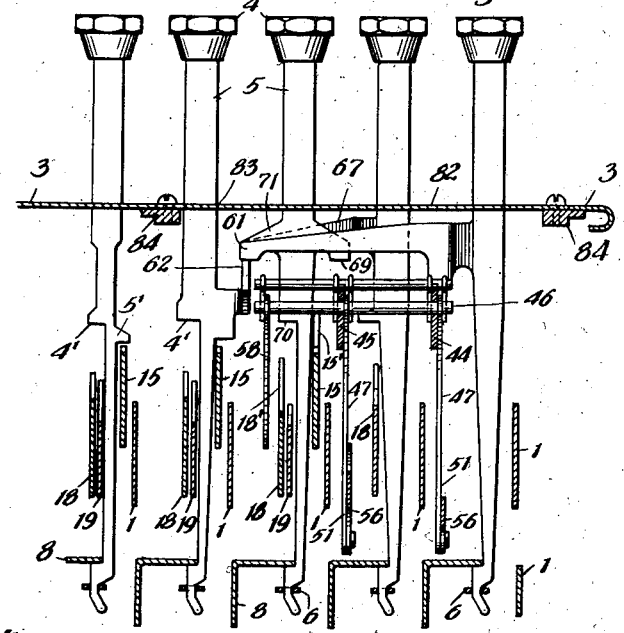
Witnesses:
Wm. Geiger
Pearl Abrams
Inventor:
Dorr E. Felt
By Munday, Evarts, Adcock & Clarke,
his Attys.

D. E. FELT.
CALCULATING MACHINE.
APPLICATION FILED APR. 5, 1913.

1,074,704.

Patented Oct. 7, 1913.

8 SHEETS—SHEET 8.

Witnesses:
Wm. Geiger
Pearl Abrams

Inventor
Dorr E. Felt
By Munday, Evarts, Adcock & Clarke,
his Atty's.

UNITED STATES PATENT OFFICE.

DORR E. FELT, OF CHICAGO, ILLINOIS.

CALCULATING-MACHINE.

1,074,704.  Specification of Letters Patent.  Patented Oct. 7, 1913.

Application filed April 5, 1913. Serial No. 759,190.

*To all whom it may concern:*

Be it known that I, DORR E. FELT, a citizen of the United States, residing at Chicago, in the county of Cook and State of Illinois, have invented a new and useful Improvement in Calculating - Machines, of which the following is a specification.

My invention relates to the calculation of fractions and to multiple-order keyboard adding-machines for that purpose, and is herein particularly shown as embodied in a multiple-order key-driven duplexing calculating-machine, the well-known comptometer set forth in such prior Felt patents as Nos. 762,520, 762,521, of June 29, 1904; 767,107 of August 9, 1904; 960,528 of June 7, 1910; 996,009 of June 20, 1911 and 1,003,723 of Sept. 19, 1911; and the application of G. S. Bollensen, Serial No. 723,035, filed Sept. 30, 1912.

The invention has for an object the special adapting of such machines, and other machines to which the invention is found applicable, to the calculation or addition of common fractions; and it has for a further object to extend the range of computation to fractions of high denominator values without unduly increasing the number or complexity of mechanical parts, or the difficulty of manufacture and operation of the machine; and at the same time to have sufficient of all the fractions dealt with visually designated to make the calculating operation convenient and free from error, and to enable any fraction to be registered by the operation of a single key. And the invention has for further objects such other improvements in structure or function as may be found to obtain in the devices hereinafter described or claimed.

The invention comprises a method of and means for registering and calculating fractions; said method consisting of dividing or separating the fractions into a plurality of parts, belonging to orders of higher and lower values, and separately registering such values and separately accumulating them; and further consisting in carrying the aggregate of such separate fractional parts accumulated in any order, to the next higher order when said aggregate equals the unity of the said next higher order. A novel means for carrying out such method comprises a plurality of orders of fraction numeral wheels having marks expressing the fractions to be dealt in, the marks being so arranged that a complete revolution of the wheel of highest order is in value of expression equal to unity, and that one step of the wheel of lowest value is equal to the smallest fraction which is to be dealt with.

It further comprises keys which are marked with some of the fractions to be dealt in, other fractions being registerable by combinations of keys.

It further comprises keys marked with a single fraction but adapted to determine the actuation of a plurality of fractionally marked wheels. For convenience of description these marked fractions may be considered as of two classes, which may be termed "wheel fractions" and "step fractions", respectively. The former are in value greater than the value of a complete rotation of the lowest wheel and each is composed of the sum of two parts. The greater part is in value equal to one or more steps of the higher wheel, and the lesser part is in value equal to one or several steps of the lower wheel.

It further comprises mechanism by which each "wheel fraction" is, upon the actuation of its key, automatically divided into its said greater and lesser parts, the greater part registered on the higher wheel (without necessarily passing through the lower wheel and thence by carry to the higher wheel), and the lesser part registered upon the lower wheel; also mechanism by which each "step fraction" key causes the lower wheel to be turned the proper step or steps; also mechanism by which the accumulation of said lesser fractional parts or "step fractions" is carried to the higher wheel when the aggregate of such accumulation is equal in value to one or more steps of such higher wheel. The means by which the greater part of a fraction, too great to be registered by less than a complete revolution of a lower wheel, is carried past that wheel without affecting it and registered directly on a higher wheel, has what may be likened to or described as a carrying function, and for convenience I refer to such means as key-carrying devices or means. To the above described elements are or may be added successively higher orders of digit numeral wheels, to such extent as is convenient for the calculating operations to be performed, and these digit numeral wheels will be provided with proper keys, accumulating mechanisms, carrying mechanisms and canceling or resetting means. Also the fraction system of keys and wheels may be extended to the right, into smaller fractions, with proper key-carrying means enabling such keys to carry past wheels of lower order to wheels of higher order.

The machine is characterized by accumulator values, and by corresponding fractions designated on the keys, all of which values and designations have a common denominator value. As illustrated, the common denominator value is 64. If the 1/64 were removed the common denominator value would be 32. If all of the thirty-second keys were removed the common denominator value would be 16, and so on. And if the system illustrated were extended toward the right by one more eight step wheel into smaller fractions, the common denominator value would be 512. If the right hand digit wheel 12 were replaced by a twelve step wheel carrying by accumulated units into a units order to the left, and having carried into it the accumulated eighths from the wheel 11, the machine would be very convenient for calculations involving feet, inches and fractions of inches down to 64ths. The key board is further characterized by the designations of the fractions on the keys, the numerator of all such designations being odd and in most instances prime. Many keys are thus eliminated, fractions which are reducible being registered by prime keys in a higher order.

In order to make the invention more clearly understood I have shown in the accompanying drawings means for carrying the same into practical effect, without limiting my improvements, in their useful applications, to the particular construction which, for the purpose of explanation, I have delineated.

Figure 14:
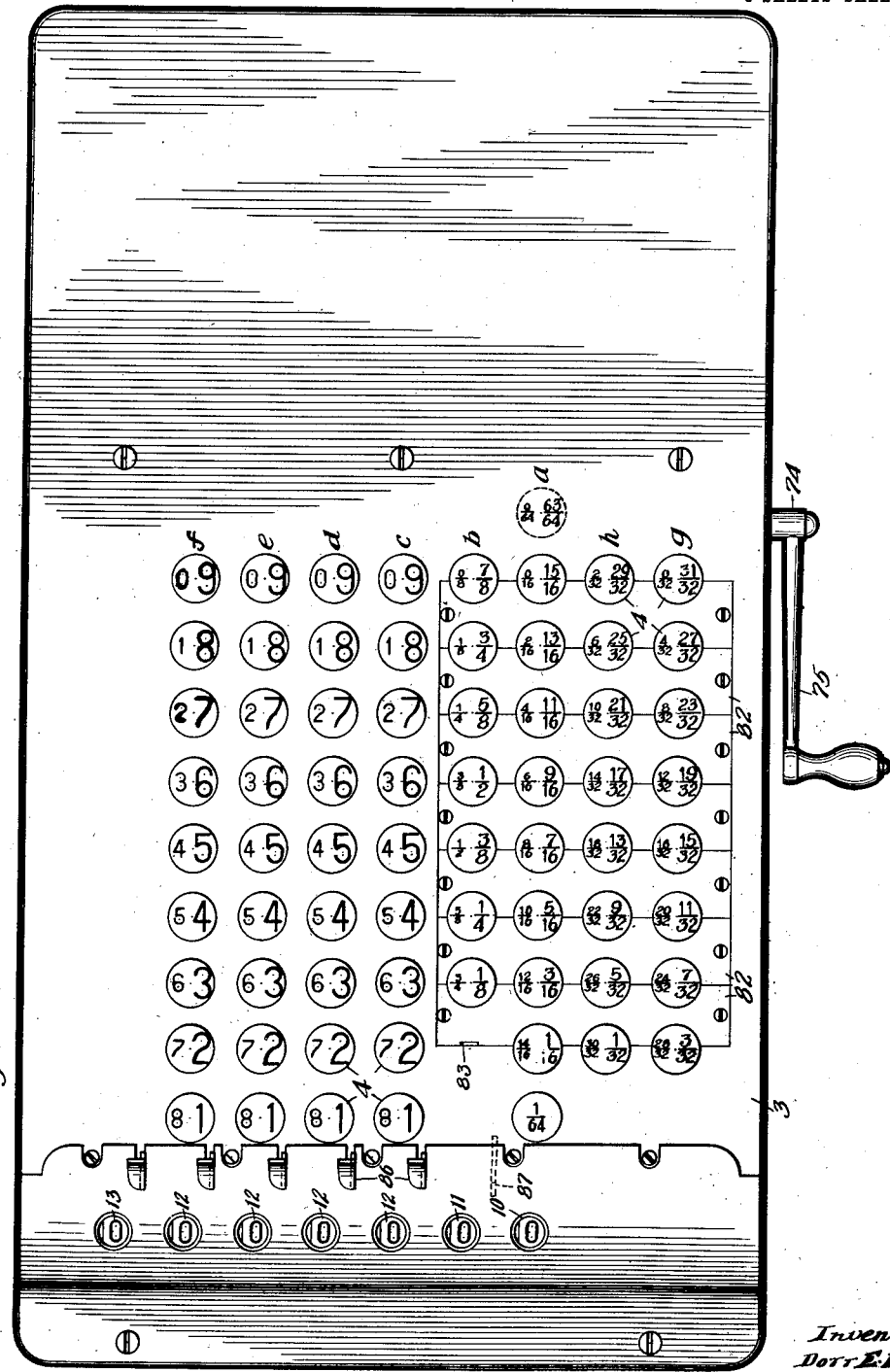

In the said drawings—Figure 1 is a plan view of a calculating machine embodying the invention, showing a co-digital marking of the integer keys and a complementary marking of the fraction keys. Fig. 2 is a vertical and longitudinal section of the same, on line 2—2 of Fig. 1, most of the calculating mechanism being omitted from the figure. Fig. 2ª shows the rear portion of the frame of the machine omitted from Fig. 2. Fig. 3 is a view similar to Fig. 2, the section being taken on line 3—3 of Fig. 1. Fig. 4 is a perspective view of a portion of the auxiliary column or numeral wheel actuator. Fig. 5 is a vertical and longitudinal section of the machine on line 5—5 of Fig. 1. Fig. 6 is a side view of the right hand or lowest fraction numeral wheel, with fractions arranged to illustrate its marking. Fig. 7 is a vertical and longitudinal section of the machine on line 7—7 of Fig. 1. Fig. 8 is a side view of the left hand or higher fraction numeral wheel, with factions arranged to illustrate its marking. Fig. 9 is a plan view of the machine with the top plate removed, the key stems being shown in horizontal section. Figs. 10, 11 and 12 are vertical transverse sections of a portion of the machine respectively on lines 10—10, 11—11, and 12—12 of Fig. 2. Fig. 13 is a plan view of a portion of the stop lever mechanism. Fig. 14 is a plan view of the machine showing a co-digital marking of the fraction keys as well as of the integer keys.

The calculating machine herein set forth has four successive orders of ten step digit numeral wheels with corresponding finger keys and accumulator and carrying mechanisms, with one overflow digit numeral wheel; two fraction eight step numeral wheels, of relatively higher and lower orders, with corresponding finger keys and accumulator mechanisms, and with carrying mechanisms operating to transfer the accumulations of value successively from the lower fraction wheel to the higher fraction wheel and from the higher fraction wheel by units to the units order of the digit orders, the keys and wheels being marked to deal with fractions whose denominators in this instance increase by multiples of two (as 2, 4, 8, 16, 32, 64); and other finger keys having key-carrying functions hereinafter set forth; but as to the particular denominators dealt with, and the extent of the apparatus above unity and below unity, the invention is not confined to this particular illustrative machine.

Referring to the drawings, the frame of the machine comprises vertical longitudinal side plates and similar intermediate or division plates, all of which are indicated by 1. They are united into a rigid frame by suitable cross or tie rods 2.

3 is the top plate. The rest of the usual casing including the bottom plate is omitted in the illustrations.

The accumulating operation, for the addition or other calculation to be done, is performed by the depression of the finger keys 4, the stems 5 of which reciprocate vertically in apertures in the top plate, the lower ends of the stems being directed and pressed upward by levers 6 and lever springs 7 supported on bottom frame parts 8. The accumulator mechanisms are actuated by shoulders or other projections on the key stems, and the result of the calculating operation appears on the numeral wheels 10, 11, 12 and 13 (or on some of them), which are mounted to turn loosely on the cross pivot shaft 14 held in the frame. The said keys are arranged in six orders, $a, b, c, d, e,$ $f$, and two sub-orders $g, h$ with from seven to nine keys in an order, forming a key board as seen in Fig. 1. The orders $c, d, e, f$ are decimal and in all respect their keys, accumulator mechanisms, and carrying mechanisms are or may be constructed as set forth in my said patents. The canceling device for all of the orders is or may be constructed as set forth in said patents. Such mechanisms for the digit orders (and also for the fraction orders, with variations which will be pointed out) comprise the following parts sufficient of which have been illustrated herein for the purpose of explanation and understanding of the present invention: Column actuator segment levers 15 pivotally mounted on a cross rod at 16 on the frame 1, and yieldingly held up by accumulator motor springs 17; even and odd stop levers 18, 19 each of which may comprise two separate co-acting parts, as shown, and which are pivoted to the frame at 20, and the stop detents 21, 22 to engage with the coarse spaced teeth 23 on the column actuator and arrest the downward movement of the latter; accumulator pinions 24 mounted on the cross pivot accumulator shaft 25 and engaged and turned by the column actuators; accumulator ratchets 26 fixed to the pinions 24; lantern wheels 27 having pawls pivoted thereon and arranged within the ratchets, whereby the ratchets turn backward freely but on their forward movement rotate the lantern wheels by means of the said pawls; a back stop pawl 28, and a locking detent 29, for each lantern wheel; intermediate gears 30 on the intermediate pick up shaft 31, which are engaged and driven by accumulator gears attached to the lantern wheels and which engage and drive the numeral wheel gears 32; carrying pinions attached to the accumulator gears and meshing with and driving carrying gears on the cross pivot carrying shaft 33, carrying motor springs encircling the shaft 33 and connecting the carrying gears yieldably with rotary escapements 34 on the shaft 33; two armed carrying cams 35 fixed on the said escapements and given, by means of the said carrying motor springs and escapements, a half revolution at each half revolution of the carrying gears or whole revolution of the carrying pinions; carrying levers 36 each of which is pivoted on the cross pivot shaft or rod 37 and is arranged in line with the lantern wheel in the next higher order of accumulator mechanism, said carrying levers being raised by the carrying cams at each half revolution of the latter; carrying pawls 38 pivoted, as are the locking detents, on the carrying levers and operating on the pins of the said next higher lantern wheel to move the latter and its accumulator mechanism one step at each carry; carry-detaining latches 39 to enable two keys in contiguous orders to be simultaneously depressed without losing a carry; cam-actuated three armed detents 40 for locking the carrying levers; canceling stops 41 for positioning the accumulator mechanisms and numeral wheels in canceling, mounted on a rock bar 42; and resistance levers 43 for modifying the key touch. The canceling means, whereby the numeral wheels are reset at zero, comprises a canceling actuator, or cancellation controlling means, consisting in this instance of a cross rock shaft 74, crank handle 75 and slotted cam 76. These parts operate on a canceling device comprising a segment lever 77 actuated by the slotted cam; a canceling pinion 78 on the canceling or intermediate shaft 31; and means by which said shaft may rotate the intermediate gears 30 when the shaft is at a predetermined point relative to the gears. The canceling means also comprise devices effecting a one-space adding movement of the column actuators, consisting of a transverse bar 79 adapted to depress the column actuators one space, which bar is reciprocated vertically by the slotted cam through the medium of arms 80, which carry the bar at their ends and are pivoted at 81 to the frame 1. All of these parts are or may be similar to those set forth in my said patents.

The columns $h$ and $g$ representing fractions of larger denominators do not have their own numeral wheels and are not true orders, but the values represented on their keys are accumulated on the wheels 10 and 11 by key-carrying means hereinafter described, including an auxiliary column or numeral wheel actuator, and they may for convenience be termed sub-orders. It will be seen that, by the use of one or more sub-orders of keys without numeral wheels, together with means for communicating the movements of such sub-keys to a numeral wheel or wheels in higher orders, a great range in the calculation of fractions is attained without minutely sub-dividing any numeral wheel. Such range of calculation of fractions is increased as the denominators of the fractions successfully operated with increase. In the example of the invention illustrated I have employed two sub-orders of keys and two numeral wheels to which the movements of said keys are communicated, and by these means, with appropriate markings and connections of the keys, I can calculate in all simple fractions having sixty-four for a denominator. By a less number of keys, fractions having smaller denominators could be calculated; and by extending the system illustrated smaller fractions having larger denominators could be calculated. Keys in order $a$ operate the numeral wheel 10 in line therewith, and, by carrying, operate the wheel 11. Also, irrespective of such carrying, they operate the numeral wheel 11 through the media of the parts 71, 62 and 15, hereinafter described. The keys in order $c$ operate the decimal numeral wheel 12 in line therewith, and, by carrying, operate the next higher wheel 12; and similarly the keys of orders $d$, $e$, and $f$, operate their respective numeral wheels and may cause a carrying to the wheels of higher orders. The wheel 13 is an overflow wheel operated in accumulation only by carrying from the order $f$.

The orders $a$, $b$ and sub-orders $g$, $h$, are fractional, of which the first two orders each has its fractional numeral wheel, 10 and 11 respectively. The wheel 11 is an eight step wheel, the value of one of its steps being one eighth, and it is divided and marked in eighths (Fig. 8). The keys of order $b$ will respectively turn this wheel the number of steps indicated on the keys, and one complete revolution of it will cause a carry of one to the wheel 12 of order $c$. The value of a complete revolution of the wheel 10 of order $a$ is the same as the value of one step of the next higher wheel 11, and such complete revolution gives the proper carry of one step, in value one eighth, to the wheel 11. The steps of the wheel 10 represent fractions the denominator of each of which is a multiple of the denominator of each of the fractions represented on the wheel 11, and its keys of order $a$ are correspondingly marked. In this instance the value of each step of the wheel 10 is one sixty-fourth, and consequently it is divided into eight steps to make the value of its complete revolution equal to the value (one-eighth) of one step of the next higher wheel 11, and it is correspondingly marked (Fig. 6). Its complete revolution makes the correct carry of one-eighth to the wheel 11. The accumulator mechanisms of the wheels 10 and 11 have column actuators 15 provided with four stops, ratchets 26 of eight steps and lantern wheels 27 of eight pins, and the carrying mechanism which operates between the wheels 10 and 11 has a carrying cam 35, carrying lever 36 and carrying pawl 38 suitable to turn the lantern wheel of the fraction wheel 11 one eighth of a revolution at each carry. Such carrying mechanism is set forth in the application of G. S. Bollensen, Serial No. 723,035, filed Sept. 30, 1912. The carry from the fraction wheel 11 to the next higher digit wheel 12 is the usual one-tenth revolution of the latter. Referring to the key board and the particular fractions indicated thereon, it will be seen that each of the keys in order $b$, representing by seven keys all of the eighths necessary to be registered, can, by a shoulder 4' on each key stem, actuate its even or odd stop levers 18, 19 (Figs. 7 and 12) and stop detents 22, 21, to arrest the column actuator 15, depressed by the key stem shoulder 5', at such degree of depression that its rising will rotate its accumulator mechanism to correspond with the marking on the key depressed. Thus, the 1/8 key will cause the detent 21 to engage beneath the bottom of the lowest coarse spaced tooth at 23; the 7/8 key will cause the same detent to engage beneath the column actuator 15 at the top of the uppermost coarse spaced tooth; and the intermediate keys will correspondingly cause one or the other of the said detents to engage beneath one or the other of the coarse spaced teeth, as may be required to actuate the accumulator mechanism to correspond with the marking of the key which is depressed. The column actuator for this purpose for use with an eight step numeral wheel, is provided with four stopping shoulders formed by the body of the actuator and the bottoms of the three coarse spaced teeth. All of the keys of the order $b$ thus do, or may operate directly on their column actuator, and the registry of all eighths is provided for. According to the usual notation of fractions the 2/8 key is marked "1/4", the 4/8 key "1/2" and the 6/8 key "3/4".

In order $a$ are provided keys for all of the odd sixteenths, adapted to cause the actuation of the fraction numeral wheel 10. These eight keys, together with the keys of order $b$, cover the whole range of sixteenths, for the even sixteenths will be registered by the latter keys; 2/16 by the 1/8 key, 14/16 by the 7/8 key, and correspondingly for the intermediate even sixteenths. It will be observed that the keys of order $a$ are arranged side by side with the keys of order $b$ in such manner that the value of each key in order $a$ is 1/16 more than the value of its opposite key in order $b$; for example 15/16=7/8 plus 1/16, and so on; and if each key in order $a$ be enabled to actuate its opposite key in the eighths order and at the same time to actuate the fraction wheel 10 for a value of 1/16, the correct value of such key so depressed in order $a$ will be registered. Thus, the 15/16 key would depress the 7/8 key, registering 7/8 on fraction wheel 11, and would turn the fraction wheel 10 for a value of 1/16 (one half revolution), registering the correct total by the sum of the turnings of the two wheels, and attaining the important advantage of getting the desired result by the depression of a single key. The mechanism intervening between and operatively connecting the keys in order $a$ and the fraction wheel 10 and the keys in order $b$, will be later referred to. In the order $a$ is included a 1/64 key which operates on the extreme front ends of its stop lever 19 and column actuator 15 (Fig. 5) to turn the fraction wheel 10 one step. Sub-orders $h$ and $g$ differ from each other in the amount of rotation which their keys impart to the fraction wheel 10; on the other hand they are all thirty-second keys and may be considered together. Only odd thirty-second keys are employed, all even thirty-seconds being registered by a sixteenth key. Thus 2/32 are registered by the 1/16 key, 30/32 are registered by the 15/16 key, and so for the intermediate even thirty-seconds. The odd thirty-second keys are arranged in the two sub-orders *h* and *g* so that their numerators shall progress by four (1/32, 5/32, 9/32, etc., and 3/32, 7/32, 11/32, etc.,) and so that they shall be respectively opposite or within convenient reach of the keys in order *b* whose values they respectively approximate. Thus the 5/32 key and the 7/32 key are arranged laterally opposite to the 1/8 (4/32) key; the 29/32 and 31/32 keys are opposite to the 7/8 (28/32) key. The result of the described arrangement is that the value of each key in sub-order *h* is 1/32 greater than the value of the opposite key in order *b;* thus 5/32 are equal to 1/8 plus 1/32, and 29/32 are equal to 7/8 plus 1/32, and so for the intermediate keys. Therefore, if each key in sub-order *h* be enabled to actuate its opposite key in order *b* and at the same time to actuate the fraction wheel 10 for a value of 1/32 (one quarter revolution), the correct value of each key in sub-order *h* would be registered when it was depressed. Similarly for each key in sub-order *g*, only they all designate values 3/32 in excess of the values of the respectively opposite wheels in order *b*, and to attain the correct registry of the designated value of any key in sub-order *g* it is requisite that it actuate its opposite key in order *b* and at the same time actuate the fraction wheel 10 for a value of 3/32 (three quarters of a revolution). The 1/64, 1/16, 1/32 and 3/32 keys, representing fractions of a value less than one-eighth, are not connected across to any key of order *b*, but operate to actuate the fraction wheel 10 individually.

I will now describe key-carrying devices or mechanism suitable to perform the above mentioned functions. The auxiliary column or numeral wheel actuator, by which the actuations of keys of the lower orders, or representing the fractions of larger denominators are transmitted to wheels in higher orders, or which (whatever values they represent) are situated out of the line of or laterally remote from the numeral wheels which they are to operate, preferably comprises parallel moving bars 44 and 45. These bars are arranged side by side along the rows of key stems from front to back of the key board and are adapted to be engaged and depressed by shoulders on, or rigid arms extending from, such key stems. The exact location and arrangement and means of supporting such bars are matters of choice and convenience, so long as they may be properly acted upon by the keys, and may in turn properly actuate the numeral wheel or wheels to be rotated by such keys. In the construction illustrated 46 is a cross rod fitted in apertures in the bars 44, 45 and serving as a pivotal support for the rear ends of the same. 47 indicates bell crank levers attached to a transverse rock bar 48 pivotally mounted at 49 on the frame 1. Each of these bell levers has a forwardly extending arm 50 and a downwardly extending arm 51, the arms 50 having pivotal connections with the cross rod 46 and yieldingly supporting the rear parts of the bars 44, 45. The forward parts of the said bars are yieldingly supported by the forwardly extending arms 52 of bell levers 53, which are pivotally supported on the cross rod 81 mounted in the frame 1. The levers 53 have downwardly extending arms 55 corresponding with the arms 51, and the four arms, 51, 51, 55, 55 are pivotally connected in pairs by horizontal links 56. There is thus formed a parallel acting or reciprocating frame, the even upward and downward movement of the bars 44, 45 of which is convenient for the transmission of key actuations to a numeral wheel which is laterally remote from such keys. This frame, which may be more briefly referred to as a reciprocating frame, need not however, move up and down equally at both ends. In the construction shown the rear end of this frame has a little more vertical movement than the front end for the purpose, among others, to aid in equalizing the key strokes, both in length and in pressure required. The frame is held up yieldingly at the proper normal level by spring pressure, and it may be so supported by one or more springs 57 connecting the said auxiliary actuator with the frame 1. (Fig. 2). 58 is a forwardly extending arm fixed on the rock bar 48 and supporting the inner or left hand end of the rod 46, which is extended into the order or column *a* over the column actuator 15 and stop levers 18, 19 thereof. The upward and downward parallel moving bars 44, 45 are well adapted to receive the same amount of depression from any one of the keys in order *a* and communicate such movement to a column actuator, at whatever distance such key may be from the pivot 16 of the column actuator, and they can perform the same function for the keys in sub-order *h*, and also for the keys in sub-order *g*. 15′ is an upward projection on the column actuator 15 in the third column of mechanism, in line with order *a*. The cross rod 46 of the auxiliary actuator bears on this projection so that the column actuator will be depressed by and with the auxiliary actuator. Also the said cross rod will, on such depression, engage the stop lever 18 in the third column (Fig. 12) and cause the column actuator to be properly arrested by the detent 22 (Fig. 5). The rod-engaging part 18′ of this stop lever in the third column is of such height relative to the height of the rod that such arrest of the column actuator will cause it to have, as it rises and actuates its accumulator mechanism and the fraction wheel 10, a value of 3/32; and this particular actuation of the reciprocating frame comprising the bar 44 is caused by each of the keys of order $g$ engaging the said bar by a shoulder 60 on its stem (Figs. 2, 10 and 11). Furthermore, each of the keys of sub-order $g$ is provided with a key-carrying device consisting of an arm 61 which extends across to the keys of order $b$ and engages the top of a forward and backward extending lug or shoulder 62 integral with or fixed to the stems of the latter keys. The depression of any of the keys in sub-order $g$ consequently depresses its opposite key in order $b$ and registers one or more eighths on fraction wheel 11, and at the same time depresses the reciprocating frame and registers 3/32 on the fraction wheel 10, the sum of the two registries being equal to the fraction designated on the key of sub-order $g$ which is so depressed.

The keys of sub-order $h$, which are to actuate the fraction wheel 10, for a value of 1/32, as above explained, operate on shoulders or steps 63 on the bar 45 (Figs. 3, 4, and 10) by stops 64 on the key stems, and the reciprocating frame is thereby caused to depress the column actuator 15', 15 by the cross rod 46. The stop lever 18, to arrest the column actuator at the proper depth of depression so that on rising it will actuate its accumulator mechanism and the wheel 10 for a value of 1/32 (two steps), is arranged in the second column (Figs. 3, 10, 11 and 12) and may be engaged by a shoulder 65 on each of the keys in sub-order $h$. The movement of the stop lever 18 in the second column is communicated to a lever arm 66 (Figs. 3 and 9) which is connected with the detent-carrying part of the stop lever in the third column and throws the detent 22 forward to engage the bottom one of the coarse spaced teeth 23 of the said column actuator 15', 15. Furthermore, each of the keys of sub-order $h$ is provided with a key-carrying device consisting of an arm 67 which extends across to the keys of order $b$ and engages the top of the said lug 62 of the latter keys. The depression of any of the keys in sub-order $h$ consequently depresses its opposite key in order $b$ and registers one or more eighths on fraction wheel 11, and at the same time depresses the reciprocating frame and registers 1/32 on the fraction wheel 10, the sum of the two registries being equal to the fraction designated on the key of sub-order $h$ which is so depressed.

The keys of order $a$ which are to actuate the fraction wheel 10 to register a value of 2/32 (a half revolution), operate on shoulders or steps 68 on the bar 45 (Figs. 4, 5, 11, 12) by means of lugs 69 on the stems of said keys, and the reciprocating frame is thereby caused to depress the column actuator 15', 15 by the cross rod 46. These keys, of order $a$, have stops or shoulders 70 at the left (Figs. 11 and 12) so arranged as to contact only with the even stop lever 18 in that column, the timing of contact and consequent throwing in of detent 22 being such as to arrest the said column actuator at a point from which, on rising, it will actuate its accumulator mechanism including the fraction wheel 10 for a value of 2/32. Furthermore, each of the keys of order $a$ is provided with a key-carrying device comprising an arm 71 which extends into column or order $b$ (Figs. 9, 11, 12) so as to engage and depress the lug 62 on a key of order $b$. Each of the keys of order $a$ may thus depress its opposite key in order $b$ and register one or more eighths on fraction wheel 11, and at the same time depress the reciprocating frame and register 2/32 on the fraction wheel 10, the sum of the two registries being equal to the fraction designated on the key of order $a$ which is so depressed. From the nature of the key-carrying connections, the key-actuating arms of the keys in column $g$, $h$, and $a$ which extend into order $b$ merely engaging on the tops of lugs 62, each key in order $b$ can be independently depressed to register eighths or even sixteenths without being obstructed by such connections and without affecting any key, accumulator mechanism or numeral wheel of lower order. In the calculation of odd sixty-fourths only is it necessary, in the particular machine illustrated, to employ two keys. There is only one key shown on which 64 is designated as the denominator, and this is the 1/64 key at the front of order $a$. It may be noted that by the provision of this single additional key the capacity of the machine is doubled. This key registers a value of 1/64 on the fraction wheel 10, operating in the usual manner through the column actuator, odd stop lever and detent 19, 21, and accumulator mechanism of order $a$. 2/64 are registered by the 1/32 key in the second column, operating, through the reciprocating frame, on the fraction wheel 10; 3/64 are registered by the successive depressions of the 1/32 and 1/64 keys; 4/64 could be registered by the 1/16 key, which acts directly on the column actuator in order $a$, but this fraction would be ordinarily written 1/16; 5/64 are registered by the successive depressions of the 1/16 and 1/64 key. All of the even sixty-fourths (which would usually be written as thirty-seconds) are registered by the proper prime keys having 32 for a denominator. Odd 64ths are registered by the successive depressions of the proper 32nd key and of the 1/64 key. The prime 16th keys may have the corresponding even 32nd designated on them, and the prime 32nd keys may have the even 64ths designated on them; and the 8th keys in order *b* may have the even 16ths designated on them; such additional markings being in accordance with the principle of the invention and not necessary to be further set forth.

There are some special features in the duplex action of the machine, by which I mean the simultaneous depression of keys in contiguous columns or orders. All of the orders *b*, *c*, *d*, *e* and *f* may be operated in duplex with accurate result, which will be the correct sum of the designations of the keys so depressed at the same time. Also the 1/64 and 1/16 keys may be operated simultaneously with any key in any higher order; and the 1/32 or the 3/32 key may be operated at the same time with any key in order *b*, or order higher than the latter. The keys which are connected across to the keys of order *b* cannot be operated with the latter keys to give the sum of the readings on two such keys. But any of such cross connected keys may be operated at the same time with the keys of orders *c*, *d*, *e* and *f* and a correct result obtained.

For convenience in assembling the machine a portion of the top plate 3 is made removable. This is conveniently effected by making said top plate, where it holds the keys of the fractional orders, of separate strips 82 extending transversely between the keys and formed with notches 83 in which the key stems work vertically. The strips 82 rest on and are screwed to longitudinal bars 84 attached to the under side of the top plate 3. The keys having lateral key-carrying arms may be put in place, and afterward the strips 82 are fitted between the key stems and secured.

For the subtraction of fractions, and other negative calculations, it is in some respects more convenient, in the use of the machine, to have the fraction keys provided with complementary designations or markings, retaining the usual co-digital marking of the integers, as illustrated in Fig. 1. Then when the subtrahend is a whole number, that is, containing only integers and no fraction, the integer keys are operated according to the usual rule for co-digital marking. But when the subtrahend is either a mixed number or a fraction only, the usual rule is deviated from by striking the right hand significant subtrahend-figure (which is the fraction) on the key negatively marked with the same fraction, instead of the key negatively marked with the fraction next lower in value; and the integer figures of such mixed number subtrahend are all struck on the keys negatively marked with those same figures (except of course that, as usual, 9's are disregarded). Thus in the subtraction of fractions, using the key board shown in Fig. 1, the key denoting the subtrahend is selected according to its exact marking, in the smaller figures at the left of the regular markings used in addition, which latter are the large figures. For example, to subtract 1930-3/8 from 3456-1/16. The minuend 3456-1/16 is first set up on the numeral wheels, which will read "3456-1/16"; this is done by striking the keys so marked; then 1930 is struck on the integer keys of orders *f*, *e*, *d* and *c*, according to the co-digital markings in small figures, which will be the keys normally (large figures) numbered 8 69 (no key being struck for the 9), holding the subtraction lever at the left of order *f*; the result will be "1525-1/16"; then strike the fraction key the complementary marking of which is 3/8, which will be the key positively or normally marked 5/8; the result will be "1525-5/8-1/16". Again, to subtract 8765-31/64 from 9876-29/64 the minuend is first set up on the numeral wheels which will read "9876 3/8 5/64"; this is done by striking the 7/16 and 1/64 keys which represent 29/64, which latter is also represented by 3/8 and 5/64; then 8765 is struck on the integer keys of orders *f*, *e*, *d* and *c*, according to the co-digital markings in small figures, which will be the keys normally numbered 1, 2, 3 and 4; the result will read 1110 3/8 5/64. The fractional part of the subtrahend, 31/64, is equal to 15/32 plus 1/64, therefore the key marked 15/32 in small figures is struck; if no key normally marked 63/64 (which would be negatively marked 1/64) is provided, the striking of which would subtract 1/64, the same result is attained by striking the normal (large figures) 31/32 and 1/64 keys. The subtraction of the final 1/64 is a separate subtraction operation and of course requires the holding of a subtraction lever at the left of enough of the minuend to contain the 1/64 subtrahend, and also requires striking the keys negatively marked zero in the integer columns, if any zeros are intermediate such subtraction lever and the fractional wheels. In the instance last above given the subtraction lever at the right of the units column is the proper lever to hold, and the subtrahend contains no zeros which require the striking of the said zero keys.

The subtraction levers are shown at 86, 87. The manipulative end of the subtraction lever 87 between the two fraction wheels is omitted to prevent error by the operator in using the wrong lever, the said lever 87 only having a function in canceling, and the lever 86 between the units wheel and the higher fraction wheel being the proper one to use when subtracting on the fraction wheels, and when the prevention of a carry to the units wheel is required.

A 63/64 key may be provided, as shown in dotted lines in Figs. 1 and 14 operating, by the column actuators, on the two fraction wheels, to register seven steps on both the higher and lower of said fraction wheels, such registry being 7/8 plus 7/64 aggregating 63/64.

When the fraction keys are co-digitally marked the operator, in performing negative calculations, may apply the usual co-digital rule throughout the key board; that is to say, for the last significant figure of the subtrahend, and considering a fraction as significant, he will depress the key next lower than that on which is co-digitally designated such last figure. A keyboard marked for this system is shown in Fig. 14. If the operator desires to subtract 3/8 from 1-3/4 he will depress the key having the co-digital marking (in said Fig. 14) next lower than 3/8, which will be the key in order $b$, marked in small figures "1/4" (which key is the key positively marked "5/8"), preventing a carry by pressing the subtraction lever between columns $b$ and $c$. The result shown on the numeral wheels will be 1-3/8. If the operator use the complementary system illustrated in Fig. 1 he will depress the key there marked in small figures "3/8" (which will be the same "5/8" key formerly used), with the same result.

By "co-digital" markings or designations on the keys I intend such negative markings the sum of which with the positive markings of the same keys is equal to the value of the rotative steps or positions less one of the numeral wheel actuated by the keys in question: the "complementary" markings aggregate with the positive markings a number which is equal to the value of all of the steps of the numeral wheel.

It will be understood that the designation of the denominator need not be actually on the top of the key. It may be indicated on the top plate of the machine at the front of the column to which it belongs, and only the numerators of such denominator designated on the key tops.

What I claim is—

1. In a calculating machine for registering and calculating common fractions, mechanism for registering separately a plurality of the component parts of such fractions, and actuating mechanism for jointly actuating such registering mechanism to register by a single operation the component parts that together equal the full value of the fraction, substantially as specified.

2. In a calculating machine, the combination of a plurality of fraction numeral wheels of higher and lower orders, keys marked to indicate fractions, and means whereby a key affects said wheels jointly and causes the value of its fraction to be registered in separate parts respectively on the said wheels, substantially as specified.

3. In a calculating machine, the combination of a plurality of fraction numeral wheels of higher and lower orders, keys marked to indicate fractions, means whereby a key affects said wheels jointly and causes the value of its fraction to be registered in separate parts respectively on the said wheels, and carrying mechanism arranged operatively between the said wheels, substantially as specified.

4. In a calculating machine, the combination of a plurality of fraction numeral wheels of higher and lower orders, keys marked with fractions of a value greater than the value of one revolution of the lower wheel, and means whereby such a key affects the said wheels jointly, to cause the higher wheel to be turned to register that part of the fraction, indicated by the key, which is equal in value to a revolution of the lower wheel, and to cause the lower wheel to be turned to register the remainder of said fraction.

5. In a calculating machine, the combination of a plurality of fraction numeral wheels of higher and lower orders, keys marked with fractions of a value greater than the value of one revolution of the lower wheel, means whereby such a key acts on the said wheels jointly, to cause the higher wheel to be turned to express that part of a fraction which is equal in value to the registering value of one or more full revolutions of the lower wheel, and to cause the lower wheel to be turned to register the remainder of said fraction, and carrying mechanism arranged operatively between the said wheels, substantially as specified.

6. In a calculating machine, the combination of a plurality of fraction wheels of higher and lower orders, an order of odd and even finger keys having means for accumulating their indicated fractional values on the higher fraction wheel, and a lower order of odd finger keys having means for actuating a lower fraction wheel, the values of the omitted even keys of such lower order being registerable by the keys of the higher order, substantially as specified.

7. In a calculating machine, in combination: keys, accumulator mechanisms composing a plurality of orders respectively higher and lower and including carrying mechanism arranged to carry from a lower to a higher order; and key-carrying devices whereby the keys of a lower order cause the actuation of accumulator mechanism of a higher order irrespective of the said carrying mechanism, substantially as specified.

8. In a calculating machine, in combination: keys, accumulator mechanisms composing a plurality of orders respectively higher and lower and including carrying mechanism arranged to carry from a lower to a higher order; and key-carrying devices whereby the keys of a lower order actuate the keys and cause the actuation of accumulator mechanism of a higher order irrespective of said carrying mechanism, substantially as specified.

9. In a calculating machine, the combination of a plurality of fraction numeral wheels of higher and lower orders, a higher order of keys adapted to actuate a higher fraction numeral wheel, a lower order of keys and a reciprocating device whereby all of the keys of lower order equally actuate the lower fraction numeral wheel, and key-carrying devices whereby the keys of lower order actuate the fraction numeral wheel of higher order, substantially as specified.

10. In a calculating machine, the combination of a higher order of keys, accumulator mechanism actuated thereby; a lower order of keys, accumulator mechanism actuated by said lower order of keys; a carrying mechanism operating between the said accumulator mechanisms; and connections whereby the keys of lower order actuate the accumulator mechanism of higher order irrespective of said carrying mechanism; the keys and accumulator mechanism of higher order being free for action irrespective of the accumulator mechanism of lower order; substantially as specified.

11. In a calculating machine, the combination of a higher order of keys, accumulator mechanism actuated thereby; a lower order of keys, accumulator mechanism actuated by said lower order of keys; a carrying mechanism operating between the said accumulator mechanisms; and connections whereby the keys of lower order actuate the accumulator mechanism of higher order irrespective of said carrying mechanism; the keys and accumulator mechanism of higher order being free for action irrespective of the accumulator mechanism of lower order; and a reciprocating part which transfers equal movements from each key of lower order to the accumulator mechanism of lower order; substantially as specified.

12. In a calculating machine, a multiple-order keyboard having a higher order of keys on which are designated a series of fractions, and having a lower order of keys on which are designated a series of fractions the denominators of which are multiples of the denominators of the fractions in the higher order and the numerators of which are odd, substantially as specified.

13. In a calculating machine, a multiple-order keyboard having a higher order of keys on which are designated a series of fractions, and having a lower order of keys on which are designated a series of fractions the denominators of which are multiples of the denominators of the fractions in the higher order and the numerators of which are odd, and having an additional key on which is designated a fraction the numerator of which is one and the denominator of which is a multiple of the said denominators of the lower order, substantially as specified.

14. In a calculating machine having ordinal actuating and carrying mechanisms, in combination: a higher order of keys, accumulator mechanism actuated thereby, a lower order of keys, and accumulator mechanism actuated by said lower order of keys, the keys of higher order having a series of fractions designated thereon, and the keys of lower order having fractions designated thereon the numerators of which are odd and the denominators of which are multiples of the denominators in the higher order, substantially as specified.

15. In a calculating machine, in combination: a numeral wheel with common-fractional markings; mechanism for actuating the wheel and keys forming a part of said actuating mechanism; the number of keys exceeding the number of markings of the wheel; substantially as specified.

16. In a calculating machine, in combination: a numeral wheel; keys and mechanism for actuating said wheel; and a reciprocating frame forming part of said mechanism whereby a plurality of columns or groups of keys are used to actuate said frame and the number of keys exceed the markings on the wheel; substantially as specified.

17. In a calculating machine, in combination: a numeral wheel; mechanism for actuating said wheel; stops for regulating the additive degree of such mechanism; said stops having a reciprocating frame with two or more contact arms and keys controlling said actuating mechanism; the keys acting on the contact arms of the levers and the keys exceeding in number the markings on the wheels; substantially as specified.

18. In a calculating machine having ordinal actuating and carrying mechanisms, in combination: two or more numeral wheels provided with mechanism for prime actuation; and a series of keys controlling the actuating mechanism of the said numeral wheels, for separate degrees of wheel movement and accumulation, the total of which is equal to that designated by the operated key, so that the manipulation of a single key will control the simultaneous movement of the said numeral wheels; substantially as specified.

19. In a calculating machine having ordinal actuating and carrying mechanisms, in combination: two or more numeral wheels, each having independent means of prime actuation and a series of keys, the manipulation of any one of which may control the said independent means of actuation of a plurality of the said wheels so as to cause simultaneous wheel actuation the sum of the values of which is equal to that designated by the key which is operated; substantially as specified.

20. In a calculating machine having ordinal actuating and carrying mechanisms, in combination: two or more accumulator wheels having common fractional markings, the markings of each wheel of higher order being multiples of the value of the accumulative degree or step of the wheels of lower order; means for prime actuation of the wheels; and keys controlling said actuation, the markings of which keys are in the form of reduced common fractions; substantially as specified.

21. In a calculating machine having ordinal actuating and carrying mechanisms, in combination: two or more accumulator wheels having common fractional markings, each having independent mechanism for prime actuation; a series of keys provided with reduced common fractional markings acting upon the said actuating mechanisms so that the manipulation of any one of the said keys will cause the wheels to be simultaneously actuated to an accumulative degree equal to the marking on the key so manipulated; substantially as specified.

22. In a calculating machine having ordinal actuating and carrying mechanisms, in combination: two or more accumulator wheels having common fractional markings each having independent prime actuator mechanism for prime actuation; a series of keys for each mechanism provided with reduced common fractional markings for independently controlling said actuator mechanisms; and another series of keys for simultaneously controlling the said mechanisms by a single key manipulation; substantially as specified.

23. In a multiple-order keyboard calculating machine, in combination with an order of keys designating integers, and an accumulator mechanism therefor; an order of keys on which are designated common fractions and an accumulator mechanism therefor; a lower order of keys on which are designated common fractions and an accumulator mechanism therefor; a carrying mechanism between each lower accumulator mechanism and the next higher accumulator mechanism; and means whereby keys of said lower fractional order are adapted to actuate a higher accumulator mechanism irrespective of the carrying mechanism; substantially as specified.

24. In a calculating machine, a multiple order key board, having denominational series of integer keys, and denominational series of fraction keys, the integer keys being positively marked and having negative co-digital markings, and the fraction keys having positive markings and complementary negative markings, substantially as specified.

25. In a calculating machine, a multiple order key board, having denominational series of integer keys, and denominational orders and sub-orders of fraction keys, the keys of the sub-orders having key-carrying means, the integer keys being positively marked and having negative co-digital markings, and the fraction keys having positive fraction markings and complementary negative fraction markings, substantially as specified.

26. In a calculating machine having ordinal actuating and carrying mechanisms, the combination of a plurality of numeral wheels, the said wheels having fractional markings, the denominator of the fraction representing the value of one step of rotation of the lowest wheel being a common denominator of all of the fractions representing the various values of the steps of rotation of all the wheels, and the sum of the fractional markings on all of the wheels, representing respectively the values of all of the steps of rotation less one of each wheel, being equal to unity less the value of one step of rotation of the lowest wheel, substantially as specified.

27. In a calculating machine, in combination: accumulator mechanism including integer numeral wheels, a plurality of fraction numeral wheels, and carrying mechanism; denominational series of integer keys and of fraction keys for actuating the said accumulator mechanism; a canceling device and controlling means therefor; and subtraction devices for controlling the carrying mechanism, the subtraction device for controlling the carrying between fraction wheels being protected from operation in negative calculation; substantially as specified.

Signed by me on the 27 day of March, 1913, in the presence of two subscribing witnesses.

DORR F. FELT.

Witnesses:
 H. N. Low,
 PHILIP E. KUNTZ.